E. A. PETERSON.
STREET RAILWAY SWITCH.
APPLICATION FILED OCT. 3, 1908.
944,817.
Patented Dec. 28, 1909.
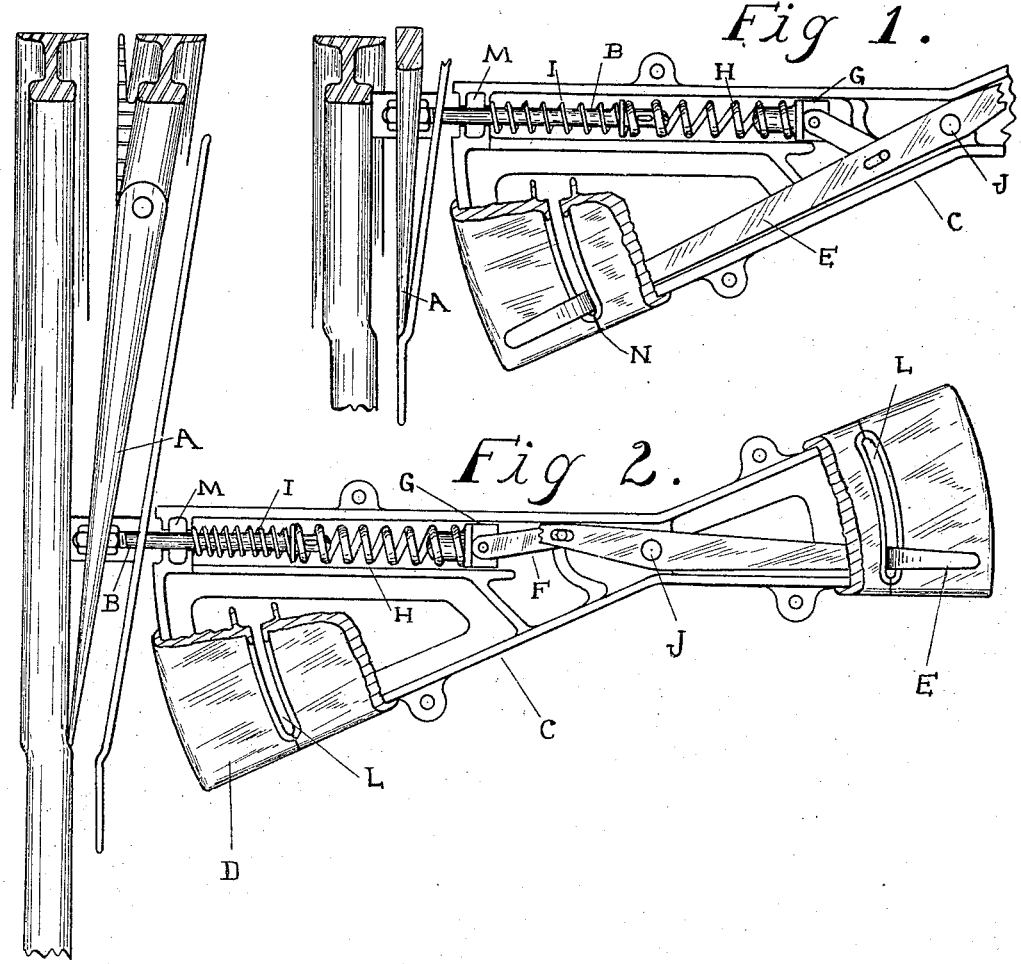
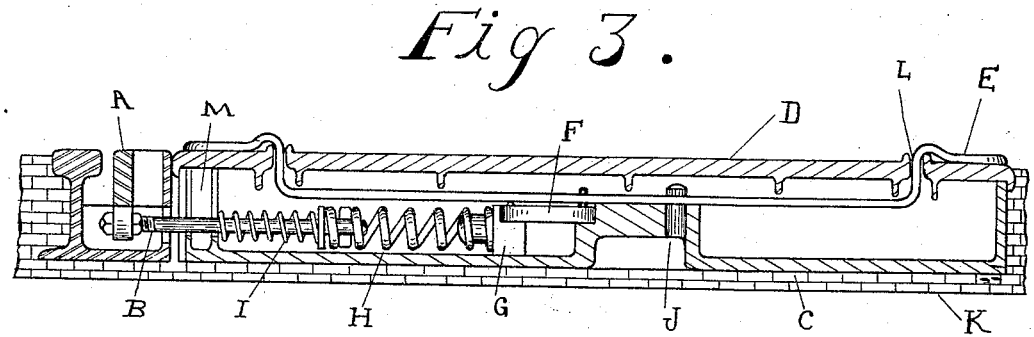
WITNESSES
D. S. Hansen
Saml Anderson
INVENTOR
Ephraim A. Peterson

UNITED STATES PATENT OFFICE.

EPHRAIM A. PETERSON, OF ROCKFORD, ILLINOIS.

STREET-RAILWAY SWITCH.

944,817.  Specification of Letters Patent.  Patented Dec. 28, 1909.

Application filed October 3, 1908. Serial No. 456,081.

*To all whom it may concern:*

Be it known that I, EPHRAIM A. PETERSON, a citizen of the United States, residing in the city of Rockford, county of Winnebago, and State of Illinois, have invented a new, simple, and Improved Street-Railway Switch, of which the following is a specification.

My invention relates to devices for operating street railway switches, such as one way, single or double switches, without the aid of a switch iron now commonly used.

This device will positively prevent the car from splitting the switch, in other words, it will prevent the rear truck from entering the other track after the front truck of the car has passed over the switch which is now very often the case especially when the switch point is worn a little.

My switch has a positive spring lock against either side of the rail. Whatever direction the switch is set the wheels of the car will open the said switch and when the said wheels leave the switch it springs back to its natural position and thereby leaving it in position for the next car to pass over the said switch. This switch may also be operated direct from the car for double switching purposes, by applying any suitable trip lever mechanism to the platform of a car, and the said trip lever mechanism to trip a lever which is pivotally secured to a box which carries the said switch mechanism.

I attain these objects through the mechanism as illustrated by the accompanying drawing, of which:—

Figure 1 is a plan view showing the switch mechanism in an open position for the main line. Fig. 2. is a plan view showing the switch as being open for a branch line. Fig. 3. is a sectional view showing the side elevation of the switch mechanism. The different parts are indicated by letters throughout the different views.

The rod B is adjustably secured to the switch tongue A, and the said rod operates through a stuffing box M. This will prevent water or dirt from entering into the switch mechanism. The said rod B is also operated through a spring I, this spring aims to keep the switch tongue up against one side of the rail, and one end of the said rod B is secured to a second spring H. This spring is heavier than the said spring I, so as to overcome the compression of the said spring I, and heavy enough to operate the switch tongue A. One end of the said spring H is secured to a block G, said block is pivotally secured to a link F, and a lever E is pivotally secured to the box C by a stud J. The said link F in connection with the said lever E when operated forms a knee joint and thereby operates the said switch tongue A, the said tongue being rigidly connected to the movable block G by the said spring H, of which one end of the said spring is secured to the block and the opposed end secured to the said rod B, and when the said lever E is thrown in the forward direction, the said spring I is compressed, and when the wheels of a car pass between the rail and switch tongue the said spring I is released and the spring H compressed, and when the said lever E is thrown in the opposite direction the springs are both in a normal condition when the wheels of a car enter between the rail and switch tongue. While in this position the said spring I is being compressed and when the wheels leave the said switch the said spring is released and the said switch tongue is moved back to its previous position. The aforedescribed mechanism is all inclosed in a box C, which has a cover D, said cover may be made in one or more sections, and the said cover lies flush with the top of the pavement in the street or rails as to allow wagons or anything else to pass over without harming the same, the said cover D has slots L L through which the said lever E operates; the said box C is supported by brick or any other suitable foundation.

Having thus described my improvements which I claim as my invention and desire to secure by Letters Patent is:—

1. In a street railway the combination with the main line rails and a movable switch tongue, of a rod secured to said switch tongue, and the said rod operated through a stuffing box and through a spring, the tension of the said spring acting upon the said rod in such a way as to keep the said switch tongue up against one side of the rail, and one end of the said rod is secured to a second spring so as to keep the said switch tongue up against the other side of the rail in such a way as to allow the wheels of a car to pass between the said switch tongue and rail and to permit said switch tongue to spring back into its natural position after said wheels have left the switch tongue, substantially as described.

2. In a street railway the combination with the main line rails and movable switch tongue, of a rod secured to said switch tongue, and the said rod operating through a stuffing box and through a spring the tension of said spring acting upon the said rod, and one end of said rod is secured to a second spring and one end of said second spring is secured to a block and said block is pivotally secured to a link and the said link is pivotally secured to a lever and the said lever is pivotally secured to a box which carries the switch mechanism; the said box carries a cover which has slots, which the said lever operates through and when the said lever is tripped, the said switch tongue will move substantially as set forth.

In testimony whereof I have signed my name to this specification in the presence of two subscribing witnesses.

EPHRAIM A. PETERSON.

Witnesses:
SAML. ANDERSON,
D. S. HANSEN.